May 29, 1923.

J. D. SMITH 1,456,942

VALVE

Filed July 19, 1922

May 29, 1923.
J. D. SMITH
VALVE
Filed July 19, 1922
1,456,942
2 Sheets-Sheet 2
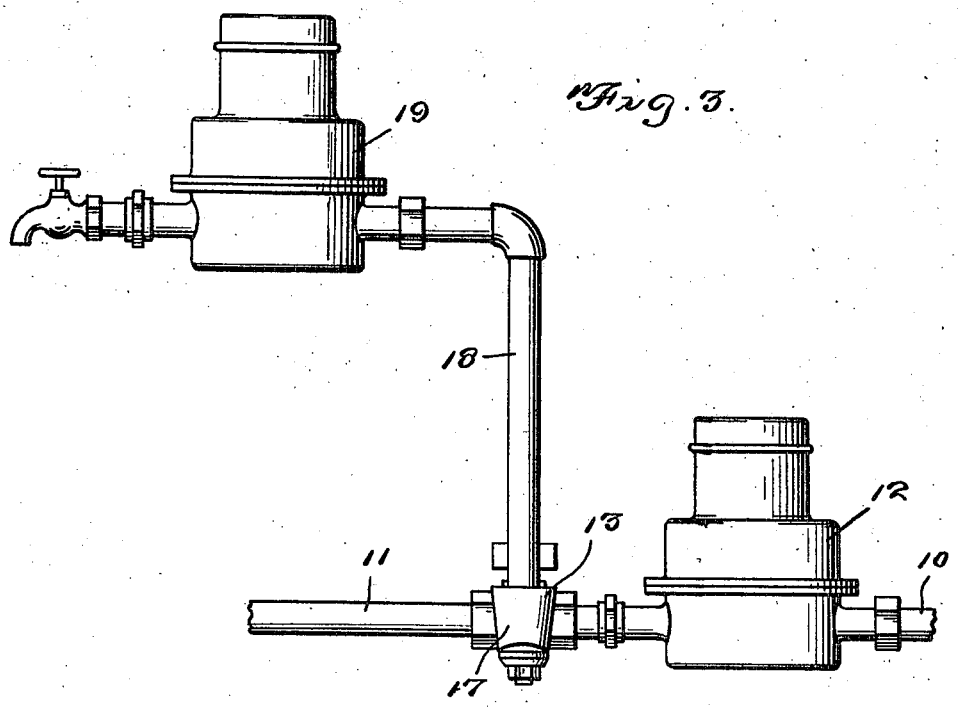
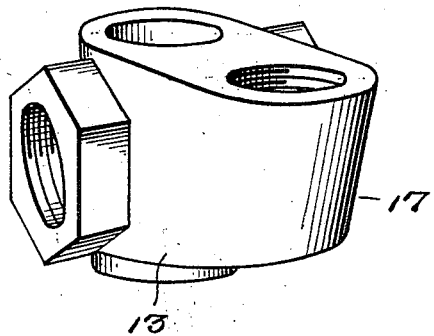
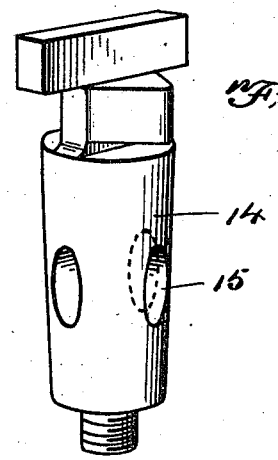
J. D. Smith
INVENTOR
BY Victor J. Evans
ATTORNEY Patented May 29, 1923.

1,456,942

UNITED STATES PATENT OFFICE.

JOHN D. SMITH, OF CHERAW, SOUTH CAROLINA.

VALVE.

Application filed July 19, 1922. Serial No. 576,084.

*To all whom it may concern:*

Be it known that I, JOHN D. SMITH, a citizen of the United States, residing at Cheraw, in the county of Chesterfield and State of South Carolina, have invented new and useful Improvements in Valves, of which the following is a specification.

This invention relates to valves, and has for its primary object, the provision of a valve which is adapted to be used with water meters of a water system, so that the meter can be tested as the occasion requires, without the necessity of removing the meter from its line connection.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 3 is a similar view, showing the position of the valve when the meter is being tested, and the association of the auxiliary meter with the valve casing.

Figure 4 is a detail view of the valve casing.

Figure 5 is a detail view of the valve.

Figure 1:
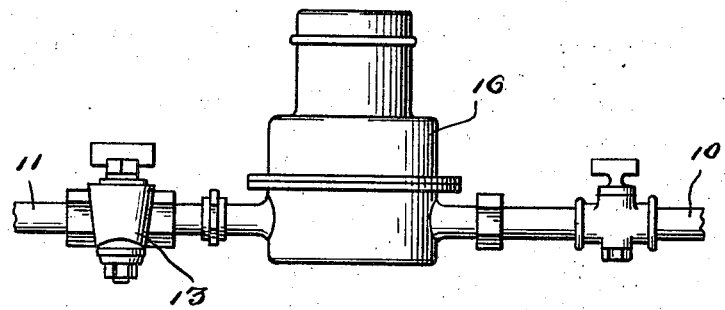
Figure 1 is view, showing the position of the valve with relation to the meter.
Figure 2:
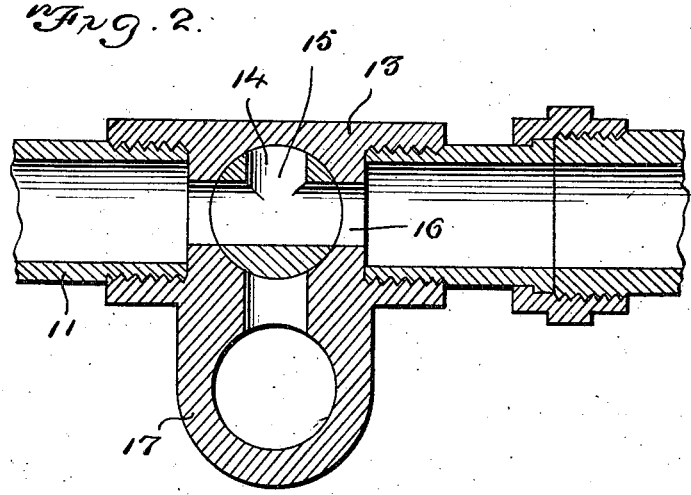
Figure 2 is a sectional view taken through the valve and its casing showing the normal position of the valve.

Referring to the drawings in detail, 10 indicates a water supply pipe which is included in a water system of any well known construction, and 11 the service pipe. Interposed between the adjacent ends of these pipes is a water meter 12; heretofore it was necessary to remove this meter from the said pipes when it was desired to test the meter, but in accordance with the valve forming the subject matter of the present invention, the removal of this meter is not a matter of necessity.

The valve includes a casing 13, which is interposed between the water meter 12 and the adjacent end of the service pipe being suitably coupled to these parts, while the body of the valve casing accommodates a rotary plug 14, having an opening 15 communicating with the main bore 16 and arranged between the ends of said bore. This valve casing is provided with an offset hollow boss 17, which opens into the body of the valve casing and the communication between these parts is obviously controlled by the valve 14. The boss 17 is interiorly threaded for a purpose to be presently described.

When it is desired to test the meter, it is only necessary to associate a pipe 18 with the hollow boss 17, the pipe rising from the meter and supporting an auxiliary meter 19 similar in construction to the meter 12. The valve 14 is then given a quarter turn to close the communication between the main pipe 10 and the service pipe 11, but establishing communication between the main pipe 10 and the hollow boss 17. The water then rises in the pipe 18 into the auxiliary meter for the purpose stated. For preventing stoppage, it is only necessary to turn the valve the necessary one-fourth revolution without associating the pipe 18 with the hollow boss, and when testing for quantity of flow, it is only necessary to insert the pipe 18 in the hollow boss eliminating the use of the auxiliary meter.

The valve is very simple in construction and can be easily installed, and its use will save considerable time and labor to those employed in testing meters of the above mentioned characters.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

The combination with spaced pipes and a meter arranged between and communicating with said pipes, a means for testing the meter without separating it from the pipes, said means including a valve casing located in one of said pipes, a hollow boss projecting from the valve casing and communicating with the latter, a rotary plug valve operating within the valve casing and including a main bore, an auxiliary opening communicating with the bore at a point between its ends, said valve being designed to alternately close the communication between the meter and one of said pipes and open communication between the valve casing and said hollow boss, a pipe adapted to be associated with said hollow boss, and an auxiliary meter supported by said pipe.

In testimony whereof I affix my signature.

JOHN D. SMITH.